July 20, 1948.  O. E. SCHURR  2,445,498
CONTROL FOR BORING MILLS
Filed May 30, 1945                                    7 Sheets-Sheet 1

INVENTOR
OTTO E. SCHURR
BY
Toulmin & Toulmin
ATTORNEYS

July 20, 1948. O. E. SCHURR 2,445,498
CONTROL FOR BORING MILLS
Filed May 30, 1945 7 Sheets-Sheet 5

Fig.6

INVENTOR
OTTO E. SCHURR
BY Toulmin & Toulmin
ATTORNEYS

July 20, 1948.　　O. E. SCHURR　　2,445,498
CONTROL FOR BORING MILLS
Filed May 30, 1945　　7 Sheets-Sheet 6

INVENTOR.
OTTO E. SCHURR
BY
Toulmin & Toulmin
ATTORNEYS

Patented July 20, 1948

2,445,498

UNITED STATES PATENT OFFICE 2,445,498

CONTROL FOR BORING MILLS

Otto E. Schurr, Hamilton, Ohio, assignor, by mesne assignments, to Lima-Hamilton Corporation, Hamilton, Ohio, a corporation of Virginia Application May 30, 1945, Serial No. 596,776

16 Claims. (Cl. 77—4)

This invention relates to boring mills, and particularly to a car wheel boring machine.

An object of the invention is to provide a car wheel boring machine that is automatic in operation for boring the journal of a car wheel.

Still another object of the invention is to provide a boring machine for boring the journal of a car wheel that is adapted to automatically chuck and center the car wheel placed upon the table of the boring machine.

Still another object of the invention is to provide a boring machine in accordance with the foregoing object wherein the chucking and/or the unchucking operation is performed in steps to gradually chuck or unchuck a car wheel.

Another object of the invention is to provide a boring machine in accordance with the foregoing object wherein the gradual steps of chucking or unchucking a car wheel are performed by operation of the main driving motor of the boring machine to alternately start and coast the driving motor, which thereby moves the chuck jaws of the machine in gradual steps in the chucking or unchucking operation.

Still another object of the invention is to provide a boring machine in accordance with the foregoing object wherein a speed-sensitive device is used for producing the alternate starts and coasting operations of the main driving motor, and which device is responsive to the speed of the chucking or unchucking operation.

Further objects and advantages will become apparent from the drawings and the following description.

Figure 1:
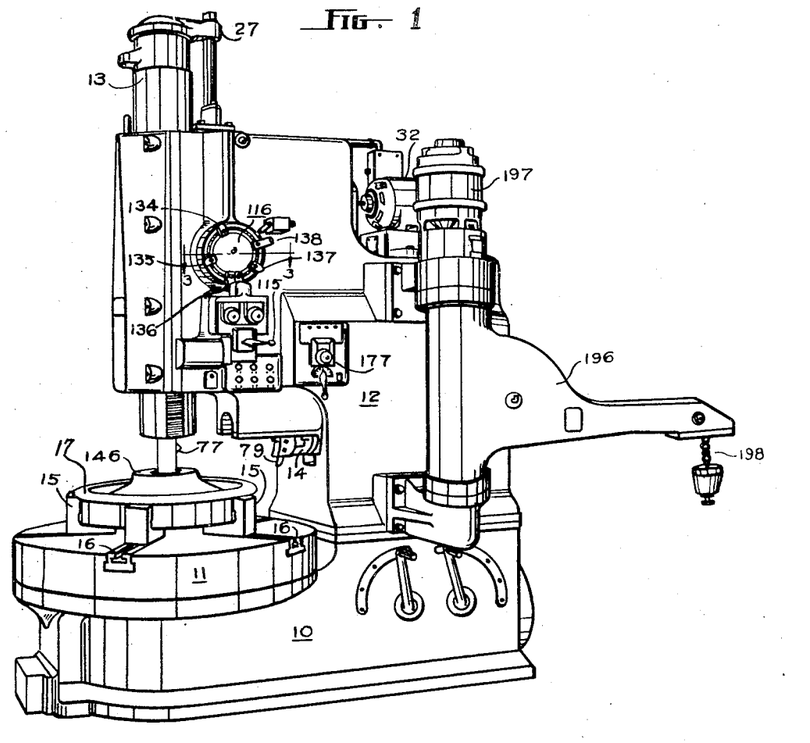
Figure 1 is a perspective elevational view of the car wheel boring machine of this invention.
Figure 2:
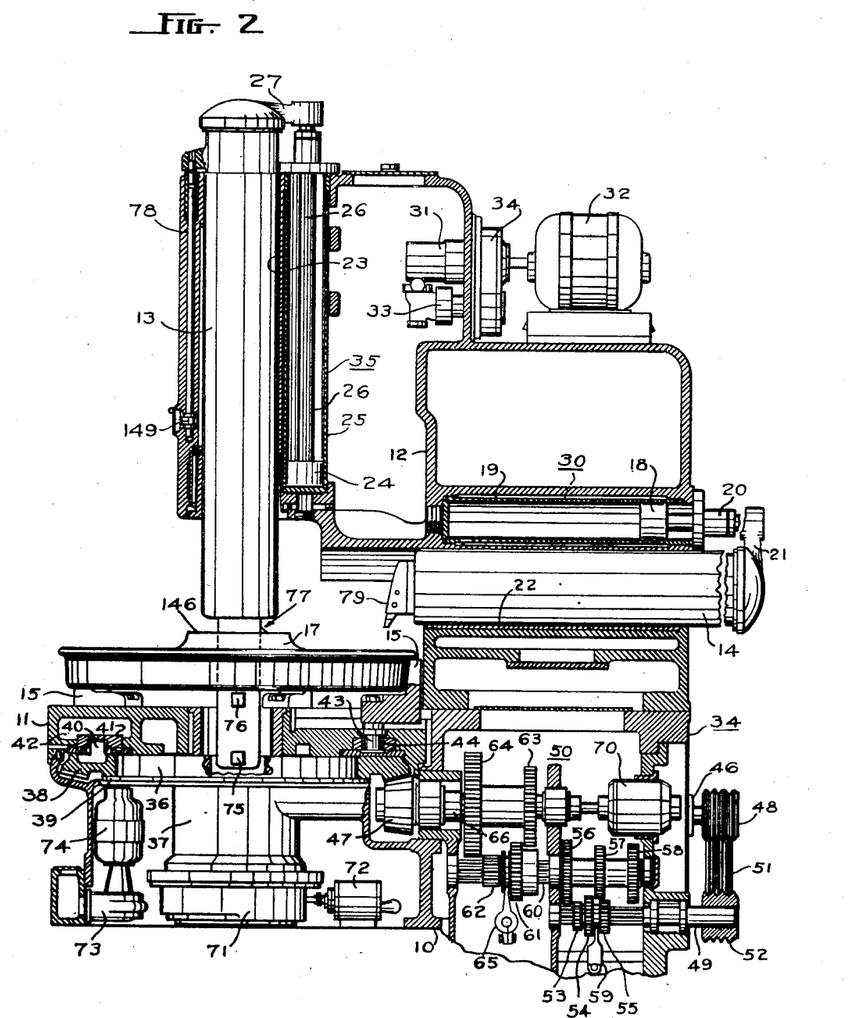
Figure 2 is a transverse cross-sectional view through the machine illustrated in Figure 1.

In this invention the boring machine consists of a bed 10 that supports a rotatable table 11. The bed 10 supports a frame 12 that carries a vertical boring bar 13 and a horizontal boring bar 14.

Figure 5:
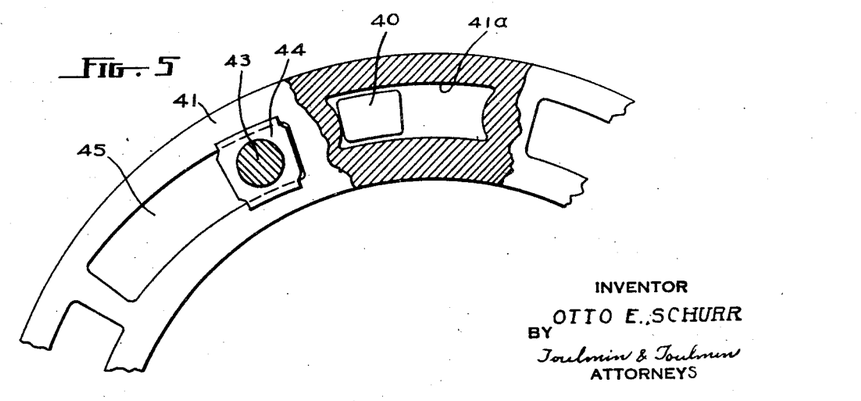
Figure 5 is a partial cross-sectional view of the table of the boring machine showing the mechanism for chucking the car wheel.

The rotatable table 11 carries a plurality of chuck jaws 15 that are slidably supported upon the guide members 16 that extend radially of the table 11 along the upper face thereof. The chuck jaws 15 are adapted to engage and retain a car wheel 17 in position to have work operations performed on it by the boring bars 13 and 14.

The horizontal boring bar 14 is hydraulically operated by a piston 18 that operates in a cylinder 19 carried in the frame 12. The piston 18 is connected to the boring bar 14 by means of a connecting rod 20 and a connecting member 21. The boring bar 14 is carried in a cylinder 22 supported in the frame 12 of the machine.

The vertical boring bar 13 operates within a cylinder 23 carried in the frame of the machine. This boring bar 13 is hydraulically operated by means of a piston 24 operating within the cylinder 25, a connecting rod 26 connecting the piston 24 with the boring bar 13 through the connecting member 27.

Figure 6:
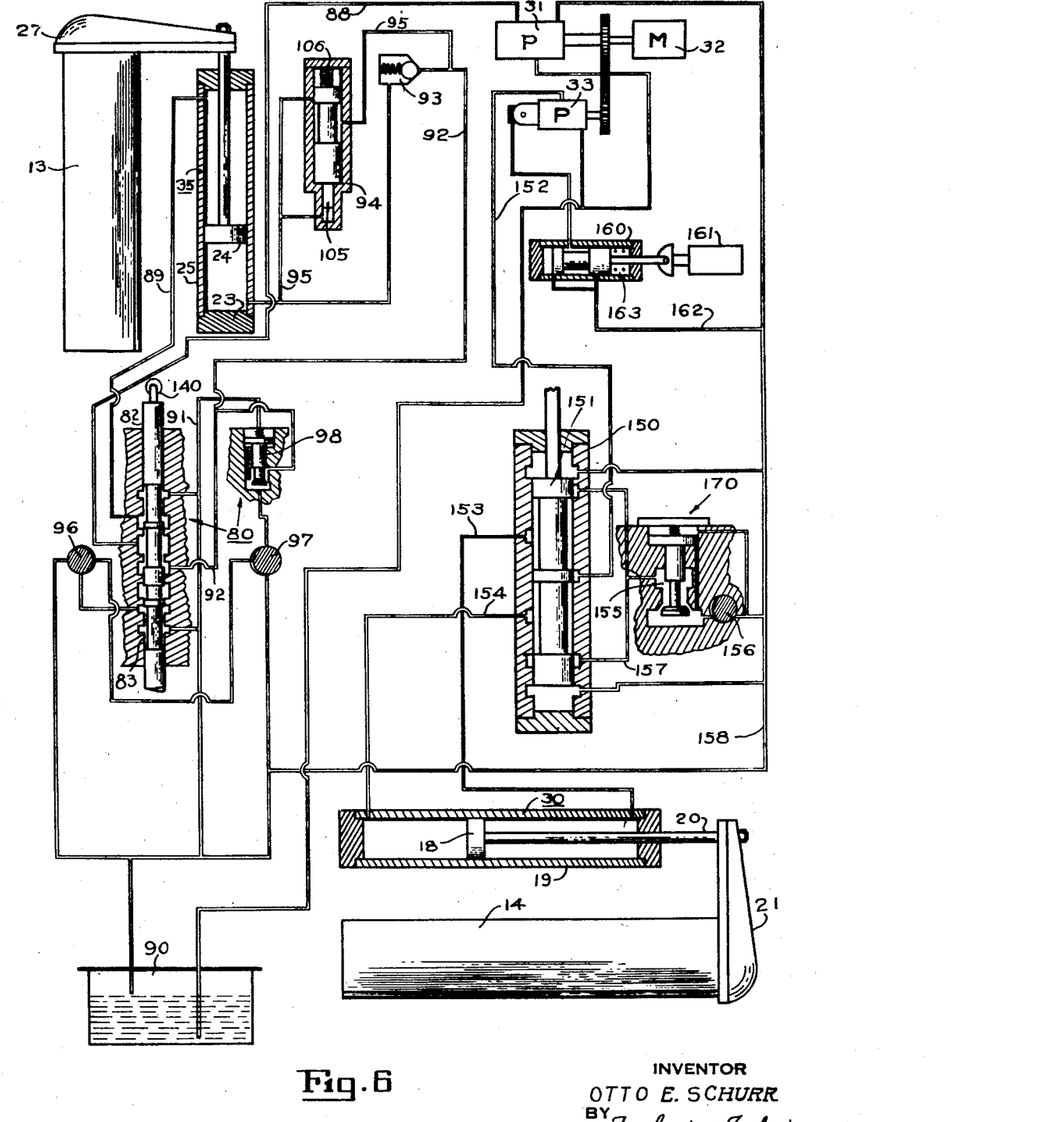
Figure 6 is a diagrammatic view of the hydraulic circuit for the machine.

Hydraulic fluid for operating the hydraulic motor 35 consisting of the piston 24 and the cylinder 25 is obtained from the pump 31 driven by the electric motor 32. The motor 32 also drives a hydraulic pump 33 through the gear-box 34 which supplies fluid under pressure to the hydraulic motor 30 consisting of the piston 18 and the cylinder 19.

The rotatable table 11 is rotatably carried upon the support member 36 to carry the weight of the table, and is suitably journaled in the housing 37, the detail construction of which is more fully disclosed and described in my copending application, Serial No. 582,243. The table 11 is driven by a ring gear 38 that is supported upon the ledge 39. The ring gear 38 carries a lug 40 that extends into an elongated opening 41a provided in the ring 41 rotatably positioned in the annular opening 42 provided in the table 11.

Each of the chuck jaws 15 carries a pinion 43 that extends into a guide member 44 positioned in elongated cam slots 45 provided in the ring 41. The radial movement applied to the pinion or pivot pins 43 upon relative movement between the ring 41 and the guide members 44 causes the chuck jaws 15 to move inwardly or outwardly, depending upon the direction of rotation of the ring 41.

The ring 41 is rotated by the lug 40 carried on the ring gear 38 when the lug strikes either end of the slot 41a, this arrangement constituting a lost motion driving connection between the ring gear 38 and the chuck jaws 15. Thus, movement of the lug 40 in a counter-clockwise direction as viewed in Figure 5 causes counter-clockwise rotation of the ring 41 to move the chuck jaws 15 radially inwardly because initial movement of the ring 41 is relative to the table 11 since the table is stationary at this time. Conversely, clockwise movement of the lug 40 causes clockwise movement of the ring 41 to cause radial outward movement of the guide members 44 in the cam slot 45 and thus such movement of the chuck jaws 15 to unchuck the car wheel at the end of the boring operation. The detail construction and operation of the aforementioned table construction is more fully disclosed and described in my copending application, Serial No. 582,243.

The drive for the table 11 consists of a gear-change mechanism 50 that is interposed between an electric motor 46 and the pinion 47. The electric motor 46 drives the pulley 48 which in turn drives the input shaft 49 of the gear-change mechanism 50 through means of the belts 51 and the pulley 52. The input shaft 49 carries a plurality of spur gears 53, 54 and 55 splined upon the input shaft 49 that are adapted to selectively engage the spur gears 56, 57 and 58, respectively, when selectively shifted into cooperating engagement therewith by the shifter 59. The spur gears 56, 57 and 58 are carried upon an intermediate shaft 60 that carries the spur gears 61 and 62 adapted to selectively engage the spur gears 63 and 64 when selectively shifted into engagement therewith by the shifter 65.

The spur gears 63 and 64 together with the pinion 47 are carried upon the driven shaft 66. The pinion 47 is carried on one end of the driven shaft 66 in meshing engagement with the gear wheel 38 for driving the same, the opposite end of the driven shaft 66 being drivingly connected to an electric generator 70 that is driven whenever the table 11 is driven, and which generator controls the chucking and unchucking action of the chuck jaws 15 in a manner hereinafter described.

When the table 11 is to be stopped from rotation, a hydraulically actuated brake 71 is provided, the brake 71 being actuated by the hydraulic motor 72 that is supplied with fluid under pressure from the pump 73 driven by the electric motor 74, the details of which brake are more fully disclosed and described in my copending application, Serial No. 582,243.

In the boring machine of this invention, a car wheel is placed upon the chuck jaws 15 upon the table 11. Thereafter, the main drive electric motor 46 is started for driving the ring gear 38 through the gear-change mechanism 50. The car wheel 17 is chucked and centered by an alternate starting and slowing down of the main drive motor 46 in a manner hereinafter more fully described. After the car wheel is completely chucked, the vertical boring bar 13 is moved downwardly on a rapid traverse stroke until the rough boring tool 75 approaches the car wheel 17. As the rough boring tool 75 approaches the car wheel 17, the boring bar 13 is advanced at a feed rate to produce the rough boring operation. When the rough boring operation is complete, the speed of advancement of the boring bar 13 is again changed to a different feed rate for moving the finishing boring tool 76 through the journal of the car wheel for finish-boring the same, and finally the chamfering tool 77 chamfers the edge of the car wheel journal, and the boring bar is brought to rest at the end of its downward stroke by an adjustable stop-rod 78. The boring bar 13 is then reversed in movement to cause a rapid upward traversing of the boring bar to its top position wherein it stops until the operator again initiates another cycle of operation of the machine. The horizontal boring bar 14 then carries its facing tool 79 across the car wheel to face the hub around the journal thereof.

A hydraulic apparatus for controlling the operation of the vertical boring bar 13 and the horizontal boring bar 14 is diagrammatically illustrated in Figure 6 wherein the electric motor 32 drives the pumps 31 and 33 heretofore referred to.

Figure 4:
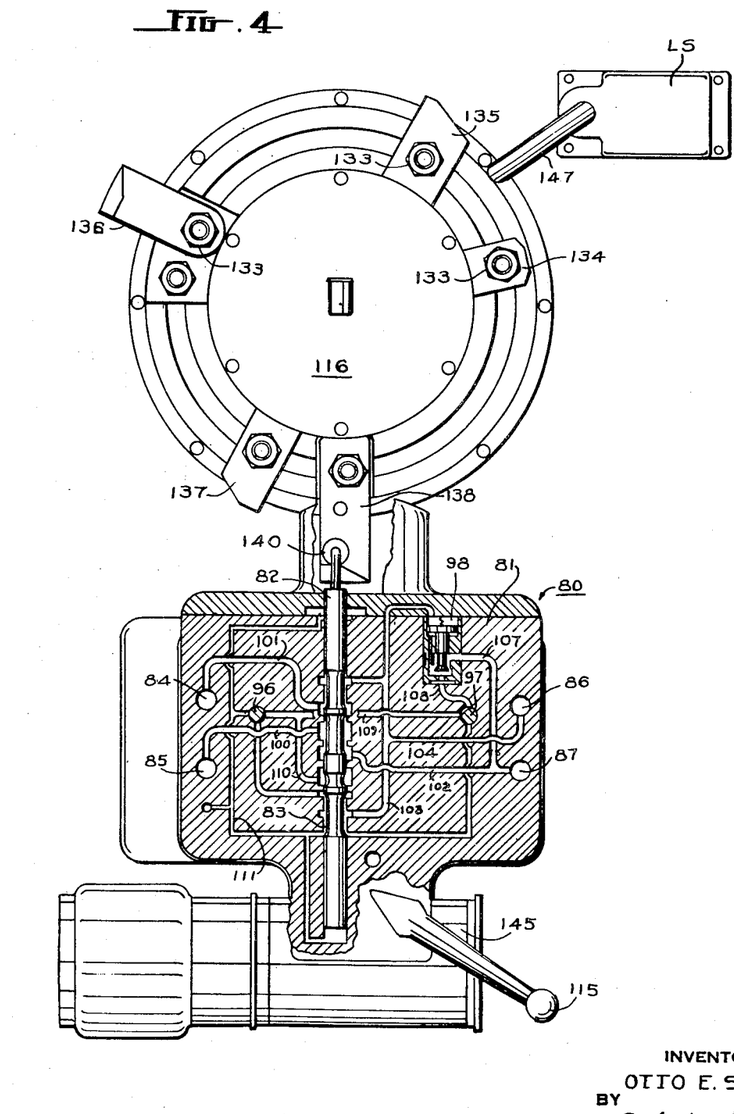
Figure 4 is a cross-sectional view of the speed controlling device that is associated with the mechanical control illustrated in Figure 3 shown diagrammatically operably connected therewith.

A speed control apparatus 80 for controlling the flow of hydraulic fluid from the pump 31 to the hydraulic motor 35 and from the hydraulic motor 35 to a reservoir is illustrated in Figure 4. The speed control apparatus 80 consists of a valve body 81 that has a valve spool 82 reciprocable therein in an internal bore 83. The valve body 81 has a plurality of passages therein interconnecting the four ports 84, 85, 86 and 87. The port 85 is the pressure inlet port from the pump 31, and in reference to the hydraulic circuit, Figure 6 will be referred to, that is connected to the port 85 by the conduit 88. The port 84 is connected to the upper end of the hydraulic motor 35 by the conduit 89 for moving the boring bar 13 on a downward stroke. The port 86 is connected to the reservoir tank 90 by a conduit 91 to return fluid under pressure to the tank from the hydraulic motor 35 from one side thereof when fluid under pressure is admitted to the opposite side of the motor. Port 87 of the speed control 80 is connected to the lower end of the hydraulic motor 35 by means of a conduit 92 that has therein a check-valve 93 for allowing free flow of fluid under pressure to the bottom side of the hydraulic motor 35 but resists return flow of fluid therethrough, a resistance valve 94 being provided in a by-pass line 95 around the check-valve 93 to insure a pressure in the lower end of the cylinder 23 during the down-stroke of the boring bar 13 and prevent a free falling of the boring bar. A compensating valve 98 maintains a constant feed rate regardless of fluctuations in cutting tool resistance or changes in operating pressure.

The speed controller 80, or more specifically, the spool 82 thereof, has five positions vertically within the body of the speed controller for producing (1) a rapid advance of the boring bar, (2) a fast-feed rate for the boring bar, (3) a slow-feed rate for the boring bar, (4) a stop position and (5) a rapid return for the boring bar. These positions are attained by the spool 82 moving through a full stroke from the top to the bottom of its movement.

When the spool 82 of the controller 80 is in its first or top position, fluid under pressure is delivered through the port 85, the passage 100, the passage 101 into the port 84 for delivery into the upper side of the hydraulic motor 35, the return fluid from the lower side of the hydraulic motor 35 being through the conduit 95 and the resistance valve 94, conduit 92 to the speed controller 80 and thence through port 87, passage 102, passage 103 and passage 104 to the port 86, and from thence to the reservoir tank by way of conduit 91, thus causing a rapid advance of the boring bar 13. At this time the resistance valve 94 functions to maintain pressure beneath the piston 24 of the hydraulic motor 35 to prevent a free falling of the boring bar 13, the resistance valve 94 being maintained closed until the pressure in the line 95 under the piston 105 of the resistance valve overcomes the spring 106, whereupon conduit 95 is opened to the flow of fluid into the conduit 92 to by-pass the now closed check-valve 93.

Downward movement of the boring bar 13 subsequently causes movement of the spool 82 of the speed controller 80 in a manner hereinafter described to change the rate of discharge of fluid under pressure from the lower side of the hydraulic motor 35, and thus change the speed of movement of the boring bar 13 to obtain a feed rate movement thereof. Two such changes in feed rate can be obtained by operation of the speed controller 80. The first change is that previously referred to as the second position of the spool 82 for obtaining a rapid feed rate of the boring bar 13. At this time fluid under pressure is still being delivered to the hydraulic motor 35 through the port 84 and the conduit 89, but the return flow of fluid from the lower side of the hydraulic motor 35 will be changed so that the fluid discharges through the conduit 95, the resistance valve 94, the conduit 92, the port 87 of the speed controller, passage 102, passage 107, pressure compensator 98, passage 108, metering valve 97, passage 109, passage 110 to passage 103 and thence to passage 104 and tank port 86. This hydraulic circuit thus places the metering valve 97 in circuit with the hydraulic flow from the return side of the hydraulic motor 35 to slow down the forward advancement of the boring bar 13 and give it a predetermined feed rate, which may permit a coarse feed or fast feed.

The movement of the boring bar 13 can then be given a second feed rate upon a movement of the spool 82 into its third position wherein the fluid under pressure is still supplied to the hydraulic motor 35 in the same manner as previously referred to and the fluid is dicharged from the lower side of the motor through the previously-mentioned conduits into the port 87 of the speed controller 80, and from the port 87 the fluid flows through the passage 107, pressure compensator 98, passage 108, metering valve 97, passage 109, through metering valve 96, passage 111 and thence to passages 103, 104 to the tank port 86, thus placing the metering valves 96 and 97 in series flow relationship to further reduce the speed of movement of the boring bar 13.

When the boring bar is to be stopped, either in its upward or downward movement, the spool 82 of the speed controlled 80 is moved into its fourth position wherein the ports 84, 85 and 87 are all connected to the tank port 86 to thereby by-pass the hydraulic motor 35, port 85 being connected to the tank port 86 through passage 100, passage 103 and passage 104, port 84 being connected to tank 86 through passage 101, passage 103 and passage 104 and port 87 being connected to the tank port 86 through passage 102, passage 103 and passage 104.

When the boring bar is to be moved upwardly, the speed controller 80 may then have the spool 82 thereof placed in its fifth position wherein the fluid under pressure is then supplied from port 85 into port 87 through the passage 100 and passage 102 to deliver the same into the conduit 92 through check-valve 93 and into the lower side of the hydraulic motor 35, the discharge from the upper side of the hydraulic motor 35 being through the conduit 89 into port 84 of the speed controller 80 and through passages 101, 103 and 104 into the tank port 86, and from thence to the reservoir 90, and thereby obtain a rapid return of the boring bar 13.

The speed controller 80 can be manually set in any one of the five positions referred to by the control handle 115, and is automatically set in any one of its positions by the rotatable cycle controller 116 that is actuated by the boring bar 13.

Figure 3:
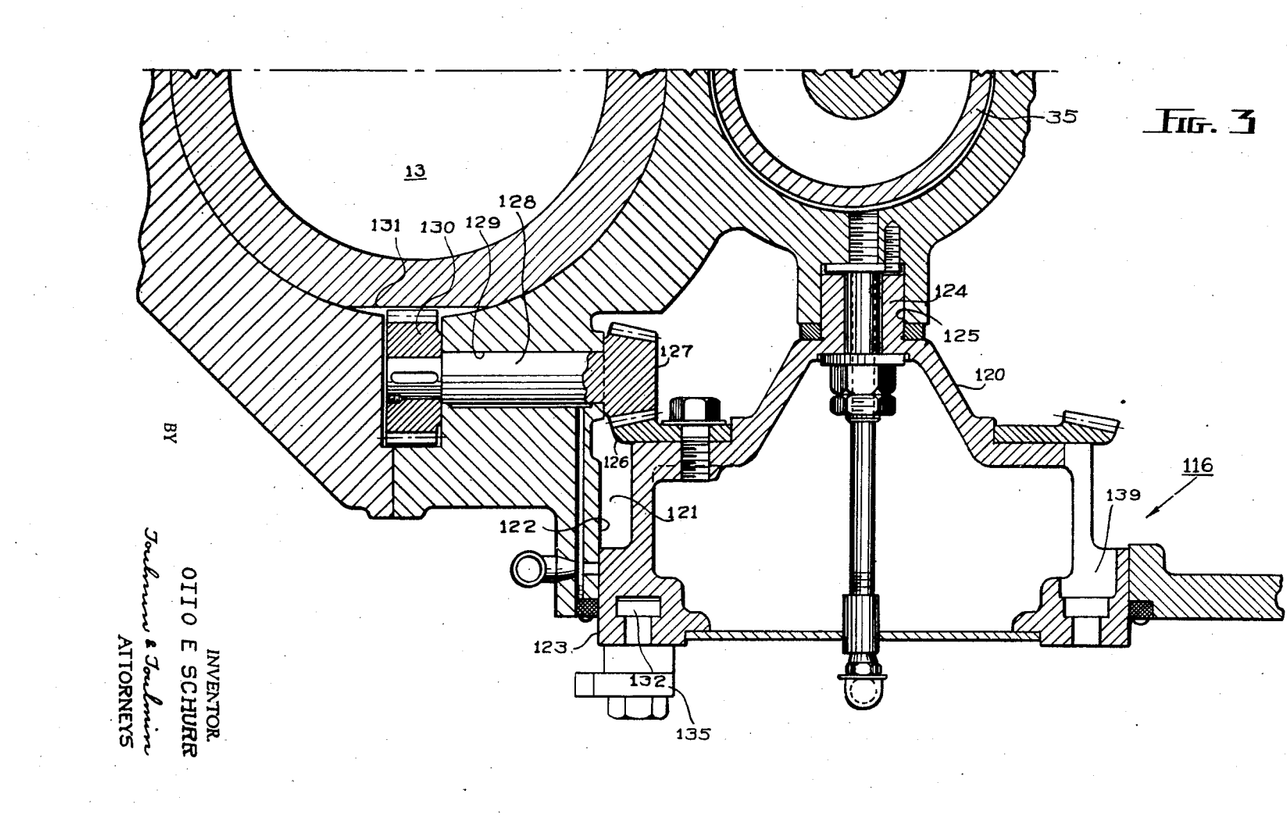
Figure 3 is a transverse cross-sectional view of the mechanical control operated by the boring bar of the boring machine to control the cycle of operation of the same and is taken along line 3—3 of Figure 1.

The cycle controller 116, shown in Figure 3, consists of a substantially cup-shaped rotatable member 120 that is positioned within a chamber 121 provided in the frame of the boring machine. The chamber 121 has the side-wall 122 thereof suitably bored to receive the member 120 and form a bearing surface for the same, the member 120 having the outer peripheral surface 123 thereof turned to fit within the bore 122. The bottom of the cup-shaped member 120 is provided with an extension 124 that is received within a bearing bore 125, the member 120 thereby being rotatably supported in the frame of the boring machine.

The member 120 carries a ring gear 126 that is engaged by a pinion 127 carried upon a shaft 128 that is journaled in the bearing bore 129 provided in the frame of the boring machine and adjacent the boring bar 13. The shaft 128 carries a spur gear 130 on the end thereof opposite to the end that receives the pinion 127, the spur gear 130 being suitably secured or keyed to the shaft 128. The boring bar 13 is provided with a rack 131 that extends vertically along the boring bar to mesh with the teeth of the spur gear 130, and thereby rotates the spur gear 130 upon reciprocation of the boring bar 13. Reciprocation of the boring bar 13 thereby causes rotation of the member 120 of the cycle controller 116.

The member 120 is provided with an annular T-shaped slot 132 that is adapted to receive square-headed bolts 133 by which cam dogs 134, 135, 136, 137 and 138 are secured to the member 120. The bolts 133 may be inserted through openings 139 provided in the member 120. The cam dogs 135 to 138 inclusive extend radially of the member 120 and are provided with cam surfaces on the outer edges thereof adapted to engage the roller 140 provided on the outer end of the spool 82 of the speed controller 80 for shifting the spool to the various positions aforementioned.

The cam dog 134 is adapted to actuate the limit switch LS that is provided in an electric circuit hereinafter described for the purpose of energizing a timing element during a chamfering operation, which timing element produces an actuation of electric controls for automatically causing operation of the speed controller 80 electrically to produce an automatic and rapid return of the boring bar when the speed controller 80 is placed in its aforementioned fifth position.

As illustrated in Figure 4, the cycle controller is in position for placing the speed controller 80 in its aforementioned fourth position or stop position.

To initiate operation of the boring machine, the manual control handle 115 of the speed controller 80 is shifted to move the spool 82 thereof into its first position, or rapid advance position, which is the top position of the spool. This movement causes flow of fluid under pressure to the hydraulic motor 35 through the aforementioned circuit for rapid traverse downwardly of the boring bar 13. The downward movement of the boring bar 13 produces rotation of the member 120 of the cycle controller 116 until the cam dog 135 engages the roller 140 of the spool 82 to move it downwardly into a feed position, and in the sequence of operation of this machine, the cam dog 135 moves the spool 82 into its third position or slow-feed position. This occurs when the first boring tool 75 is ready to engage the journal of the car wheel 17. When the tool 75 passes through the journal of the car wheel, the second boring tool 76 is ready to enter the journal for a finish-boring operation. At this time, the cam dog 136 engages the roller 140 of the spool 82 to lift the spool from its third position to its second position, or fast-feed position. The finishing tool 76 is then carried through the journal of the car wheel for the finish-boring operation.

Continued downward movement of the boring bar 13 continues rotation of the member 120 of the cycle controller 116, and when the chamfering tool 77 approaches the hub 146 of the car wheel 17, the cam dog 137 is ready to engage the roller 140 of the spool 82 to again move the spool from its second position to its third position for a slow-feeding operation during the chamfering of the hub of the car wheel.

When the chamfering operation begins, the cam dog 134 engages the actuating arm 147 of the limit switch LS which in turn energizes a timer that subsequently controls a solenoid 145 upon completion of the timing operation to shift the spool 82 of the speed controller 80 into its fifth or rapid-return position. The limit of downward movement of the boring bar 13 is controlled by the adjustable stop-rod 78 that has an adjusting mechanism 149 for setting the upper end of the stop-rod 78 to control the limit of downward movement of the boring bar 13.

When the solenoid 145 is energized, placing the speed controller 80 into a rapid-return position, fluid under pressure is delivered to the lower side of the hydraulic motor 35 to raise the boring bar 13, thus rotating the member 120 of the cycle controller 116 in a counter-clockwise direction, the aforementioned rotation of the member 120 during the downward movement of the boring bar 13 being in a clockwise direction. As the boring bar 13 approaches the upper end of its movement, the cam lug 138 engages the roller 140 on the spool 82 of the speed controller 82 to move the spool from its fifth position to the fourth or stop position, thereby halting upward movement of the boring bar 13. The machine then stops and the car wheel is unchucked in a manner hereinafter described so that a new wheel can be placed in position on the table 11 and the machine again started manually for a boring operation by movement of the control handle 115 of the speed controller 80, and the cycle hereinbefore mentioned is repeated.

After the vertical boring operation is completed, a horizontal facing operation can be made upon the face of the hub 146 of the car wheel 17 by the boring bar 14 and the tool carried thereby. This operation is performed manually by shifting the position of the spool 151 of the 4-way valve 150, see Figure 6. Fluid under pressure is supplied from the pump 33 through the conduit 152 to the 4-way valve 150 and thence through either of the service lines 153 or 154 for reciprocation of the piston 18 of the hydraulic motor 30, which thus causes reciprocation of the boring bar 14. When fluid under pressure is supplied to either end of the hydraulic motor 30, see Figure 6, the discharge of fluid from the end of the hydraulic motor opposite that receiving fluid under pressure is conducted through a speed controller 170 consisting of a pressure-compensating device 155 and a metering valve 156 by way of conduit 157 before the fluid is discharged into an exhaust line 158 to thereby control the speed of movement of the boring bar 14.

The operation of the boring bar 14 is interlocked with the operation of the main drive motor 46 of the boring machine by means of a by-pass control valve 160 that is actuated by a solenoid 161 so that when the solenoid is energized during the period of time when the main drive motor is operating, the by-pass line 162 through the valve 160 will be closed and thereby the pump will develop pressure in the discharge line 152. However, should the main drive motor be stopped for any reason, the spring 163 in the valve 160 will cause the by-pass line 162 to be opened for by-passing the pump discharge from the pump 33 so that fluid under pressure cannot be supplied to the hydraulic motor 30 to operate the boring bar 14.

Figure 9:
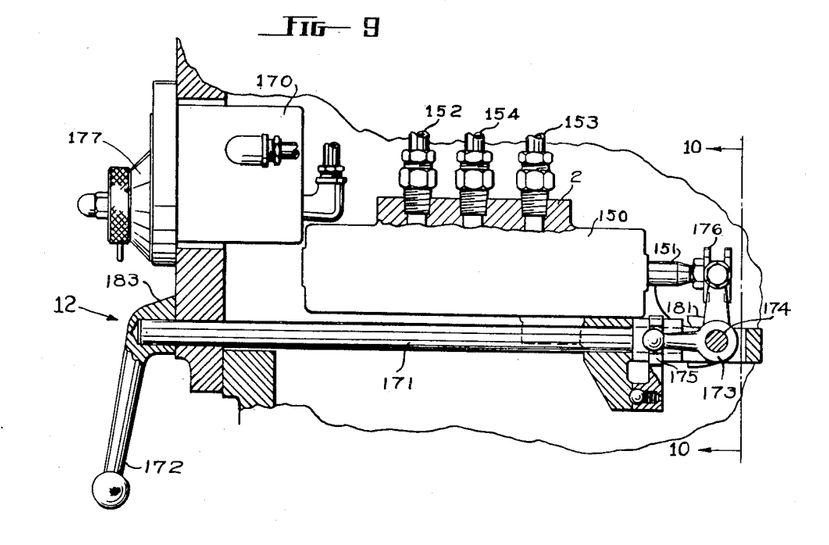
Figure 9 is a cross-sectional view, partially in elevation, of the control valve for regulating the horizontal boring bar of the machine.
Figure 10:
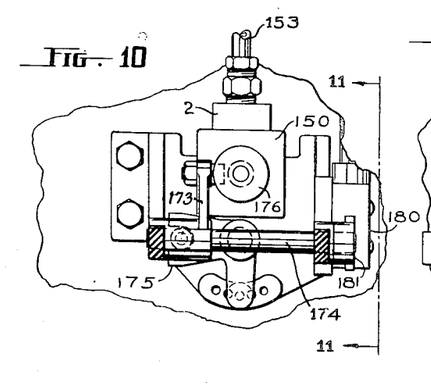
Figure 10 is an elevational view of the mechanism illustrated in Figure 9 and is taken along line 10—10 of Figure 9.

The 4-way valve 150 is actuated by a manually operable control rod 171 having an operating handle 172 that rotates the control rod 171 which, through a bell-crank lever 173 pivoted upon the pivot pin 174 operates the spool 151 of the 4-way valve 150. The ends of the bell-crank lever 173 engage a yoke 175 on the end of the control rod 171 and a yoke 176 on the end of the spool control rod 151. The speed controller 170 is located adjacent the 4-way valve 150, see Figure 9, and is provided with a manually operable dial 177 for setting the metering valve 156.

The solenoid 161 for actuating the solenoid valve 160 is interlocked with the operation of the manual control handle 172 so that the horizontal boring bar 14 cannot be moved at a feed rate unless the main driving motor 46 of the boring machine is in operation, but the boring bar can be manually traversed regardless of whether the main drive motor is operating should it be desirable, such as when setting up the tools.

Figure 11:
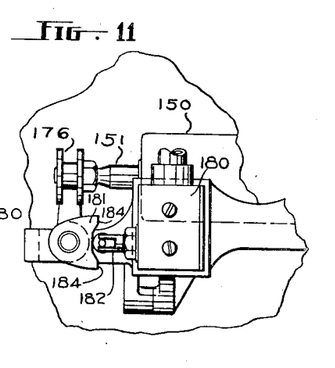
Figure 11 is an elevational view of a part of the mechanism illustrated in Figures 9 and 10 and is taken along line 11—11 of Figure 10.
Figure 12:
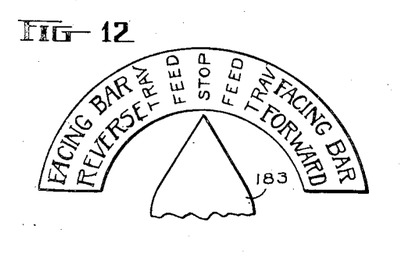
Figure 12 is a front elevational view of the control handle of the mechanism illustrated in Figure 9 and is taken as viewed in the direction of the arrow 12.

This interlock is obtained by the use of an electric switch 180 that has one pair of normally closed contacts and a pair of normally open contacts, the electric switch being placed electrically in circuit with the solenoid 161. The normally closed contacts are arranged in the electric circuit hereinafter referred to in such a manner that the main drive motor 46 must be energized and operating before current can pass through the solenoid 161 to energize the same to close the by-pass valve 160. However, should the main drive motor be stopped an actuating member 181, see Figure 11, is provided in the end of the manual control rod 171 for engaging the actuating member 182 of the electric switch 180 to close the normally open contacts. When the actuating handle 172 is moved with the pointer 183 thereof, see Figure 12, to the traverse position, at which time either of the cam projections 184 on the member 181 can close the normally open contacts of the electric switch 180 to energize the solenoid 161 and close the by-pass valve 160 so that fluid under pressure can be delivered to the hydraulic motor 30 for actuating the horizontal ram 14. However, the cam projections 184 are spaced apart a sufficient distance that when the manual control handle 172 is in either feed position, the switch 180 will not be actuated for closing the normally open contacts, thus rendering the normally closed contacts the only effective contacts for carrying current to the solenoid 161, and thus the main drive motor must always be energized and operating in order to obtain a feed rate movement of the horizontal boring bar 14.

The generator 70 is adapted to control an electrical mechanism for alternately opening and closing the electric circuit to the main drive motor 46 and thereby alternately power drive the motor 46 and permit the same to coast. This operation is performed during the chucking of a drive wheel in the chuck jaws 15 to gradually bring the chuck jaws into engagement with the drive wheel and center the drive wheel between the chuck jaws. After the chucking operation is complete, the main drive motor is operated at full speed and the boring operations previously described are performed upon the car wheel. At completion of the boring and chamfering operations, the boring bar is withdrawn and then the clutch jaws are unchucked in the same manner in which they were chucked.

Figure 7:
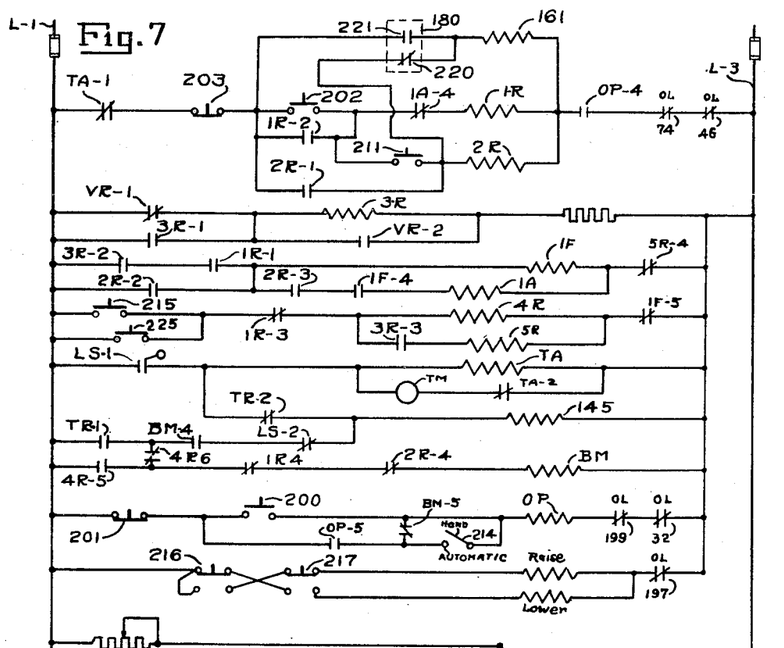
Figure 7 is a schematic wiring diagram of a part of the control circuit for the machine.
Figure 8:
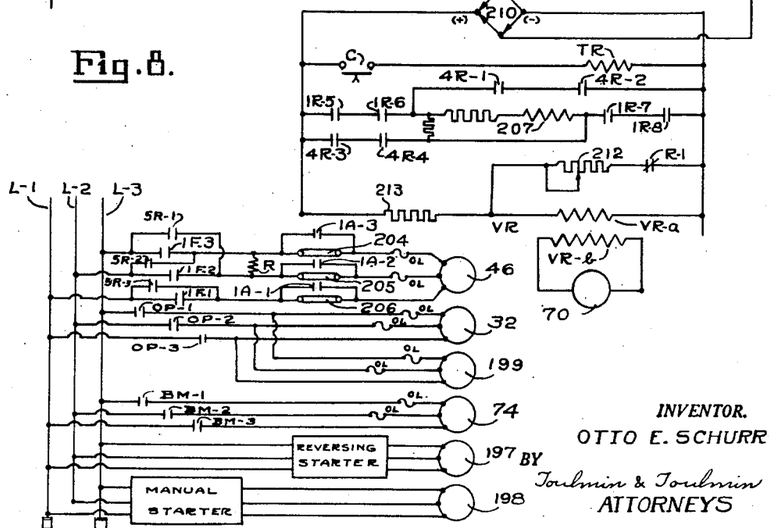
Figure 8 is a schematic diagram of a second part of the control circuit showing the 3-phase power circuits to the electric motors.

The electrical system for performing the various afore-mentioned operations and the operation of the system as applied to the boring machine will be described together, special reference being made to Figures 7 and 8 which illustrate diagrammatically the electric circuit, Figure 8 being the specific 3-phase circuit for the electric motors.

To begin operation of the boring machine, the operator first starts the motor 32, that supplies hydraulic pressure in the hydraulic system shown in Figure 6, by depressing the pump starting push-button 200 which closes a circuit from power line L—1 through the normally closed pump stop push-button 201, the contactor coil OP, and the normally closed overload relay contacts for motors 199 and 32, to the power line L—3. The contacts OP—1, OP—2 and OP—3 of the contactor OP are thereby closed to supply current to the pump motor 32, and also to the lubricating pump motor 199. The contactor OP is held energized, after depressing the push button 200, by contact OP—5, together with normally closed contact BM—5 and/or selector switch 214 marked "Hand-automatic" when in the automatic position. The coolant pump motor 198 is manually started at any time. A stop push button 201 is provided for breaking the circuit through the contactor OP to stop the pressure pump motor when the system is to be shut down.

After a car wheel is placed in position upon the chuck jaws 15, the chucking operation is started by depressing the chucking push-button 202, it, of course being understood that the machine stop push button 203 is closed at this time since all push-buttons used on this machine are of the momentary contact type. When the push-button 202 is depressed, relay 1—R is energized by a circuit made from the power line L—1, through normally closed timer contact TA—1, through the stop push button 203, the chuck push button 202, normally closed contacts 1A—4 relay coil 1—R, now closed contacts OP—4 (which closed when contactor OP was energized), normally closed overload relay contacts for motors 74 and 46, to the power line L—3. Relay 1—R is held energized by its auxiliary contact 1R—2. Energizing of relay 1—R causes energization of contactor 1—F upon closing of contacts 1R—1, contacts 3R—2 being closed at this time because relay 3R is energized in view of the normally closed contacts VR—1 that are now closed because of non-operation of relay VR. Contactor 1F thereby closes contacts 1F—1, 1F—2 and 1F—3 to supply current from the power lines L—1, L—2 and L—3 to the main drive motor 46, the current now being supplied through the resistors 204, 205 and 206 to reduce the voltage supplied to the motor 46 and cause the same to rotate at a low speed. Energizing relay 1R also caused the closing of contacts 1R—5, 1R—6, 1R—7 and 1R—8 that energize the generator field 207 of the generator 70. Since the generator 70 is driven by the main drive motor through the same shaft that drives the gear wheel 38 for producing the chucking operation, the voltage generated by the speed measuring generator 70 is proportional to the speed of movement of the gear wheel 38 and thus proportional to the speed of the chucking operation produced by the chuck jaws 15.

The relay VR associated with the speed-regulating generator has two coils, VR—a and VR—b, the coil VR—a being excited from a copper oxide rectifier 210, through an adjustable resistance 213. A resistance 212 being provided to by-pass current from the coil VR—a when normally closed contacts R—1 of relay R are closed. However, when current was supplied to the electric motor 46, relay R was energized to open relay contacts R—1 thereby supplying the major amount of current to the coil VR—a of the relay VR. The coil VR—a provides a certain amount of flux, but is insufficient to close the relay or to hold it in. Therefore, as the motor 46 accelerates, the voltage of the speed-measuring generator increases causing an increased amount of flux in coil VR—b until the relay VR picks up at a definite and predetermined speed. When the relay VR picks up, contacts VR—1 are opened thereby de-energizing relay 3—R to reopen contacts 3R—2 and thereby de-energizing contactor 1F to open contacts 1F—1, 1F—2 and 1F—3 to shut off the supply of current to the main drive motor 46. Simultaneously with opening of contactor 1F, relay R is de-energized to close contacts R—1 to by-pass current from short-circuit coil VR—a of relay VR to decrease the flux so that at the time the main drive motor has its current shut off and begins to coast, the combined flux in relay coils VR—a and VR—b is just slightly greater than that required to hold relay VR in the operated or closed position.

As the drive motor 46 now slows down, the flux in relay coil VR—b decreases until relay VR drops out, thereby again closing contacts VR—1 to re-energize relay 3—R and thereby reclose contacts 3R—2 to re-energize contactor 1F and close contacts 1F—1, 1F—2 and 1F—3 to re-energize the main drive motor 46. This alternate acceleration and coasting of the main drive motor 46 continues until the chucking operation is complete, at which time the chuck jaws 15 grip the car wheel 17 and cause the table 11 to rotate slowly.

The operator now depresses the run push-button 211 which provides a circuit from the power line L—1 through the closed TA—1 contacts, stop button 203, now closed contact 1R—2, run push button 211, relay coil 2R, closed contact OP—4 and closed overload relay contacts 74 and 46, to the power line L—3. Relay 2R closes relay contacts 2R—1 and holds itself energized. Contacts 2R—1 parallels contacts 3R—2 and 1R—1, whereby a circuit is made from the power line L—1 through the contactor coil 1F and reverse contactor interlock normally closed contact 5R—4 to the power line L—3 for closing contacts 1F—1, 1F—2 and 1F—3. Simultaneously with the establishing of this other circuit to keep contactor 1F energized, a parallel circuit is made through contactor 1A, contacts 1F—4 being now closed because of energization of contactor 1F, and relay contacts 2R—3 having closed with relay 2R. Contactor 1A closes contacts 1A—1, 1A—2 and 1A—3 to by-pass the resistances 204, 205 and 206 so that full voltage from the power lines L—1, L—2 and L—3 can be supplied to the main drive motor 46 and bring the same up to full speed. An interlock contact 1A—4 opens when contactor 1A is energized to de-energize relay 1R and thereby open contacts 1R—5, 1R—6, 1R—7 and 1R—8 to de-energize the generator field 207, thus cutting out the effect of the generator on the operation of the electric circuit when the main drive motor 46 is operating at full speed.

The machine is now in condition for performing the boring operations as performed by the operation of the hydraulic circuit hereinbefore disclosed and described. As previously mentioned, the last operation on the car wheel 17 is the chamfering of the wheel hub 146, and the boring bar 13 is then stopped against the positive stop 78. When this occurs, limit switch LS is operated by the cam lug 134 to close contacts LS—1 and open contacts LS—2. Contacts LS—1 energize a timer TA consisting of a solenoid coil TA, a synchronous telecron motor, normally closed time limit switch TA—2 and timer motor TM. The adjustable time limit switch with its normally closed contacts TA—2 is mechanically opened by the motor TM and stays open until solenoid coil TA is de-energized, then the TA—2 contact closes immediately. At the expiration of the time period of the timer TA, contacts TA—1 are opened, thereby de-energizing the relay 2R which in turn causes contactors 1F and 1A to be de-energized and thereby stop the operation of the main drive motor 46. As long as the main drive motor 46 is rotating, a centrifugally operated switch C keeps its contacts closed to maintain relay TR energized and thereby maintain contacts TR—1 closed and contacts TR—2 open while the electric motor 46 continues to rotate.

When relay 2R was de-energized to remove the power source from the main drive motor 46, this caused contacts 2R—4 to close thereby establishing an electric circuit through the contactor BM from the power line L—1 through now closed contacts TR—1, contacts 4R—6, 1R—4, 2R—4, contactor coil BM to the power line L—3. Contactor BM closed contacts BM—1, BM—2 and BM—3 to start the electric motor 74 to drive the pump 73 for supplying fluid under pressure to the hydraulic brake 71 and thereby bring the table 11 of the machine to a quick stop.

When the table of the machine stops, and thus the main drive motor 46 stops, switch C is opened to de-energize relay TR and thereby after a short time delay opens contacts TR—1 to stop the brake motor and closes contacts TR—2 for making a circuit through the electric solenoid 145 from the power line L—1 through now closed limit switch contacts LS—1, contacts TR—2 and solenoid 145 to the power line L—3. Energization of the solenoid 145 shifts the speed controller 80 to its fifth position to cause a rapid return of the boring bar 13. The controller 80 is then mechanically placed in its fourth position to stop the movement of the boring bar when it reaches the top of its stroke. The limit switch LS was reset when the boring bar 13 was moved away from its chamfering position.

If during the downward movement of the boring bar the stop push button 203 should be opened, relay 2R will be de-energized which in turn de-energizes contactors 1F and 1A to stop the main drive motor 46. However, regardless of the down position of the boring bar 13, the hydraulic motor 74 for actuating the hydraulic brake 71 will be operated because at the time the main motor 46 begins coasting, switch C being closed, the relay TR being energized with contacts TR—1 closed, thereby establishes a circuit through the contactor coil BM in view of the now closed contacts 1R—4 and 2R—4. When contactor BM is energized, contacts BM—4 are closed to establish a circuit from power line L—1 through now closed contacts TR—1, now closed contacts BM—4, contacts LS—2 and solenoid 145 to the power line L—3, to immediately move the speed controller to its fifth position and cause a rapid return of the boring bar 13. This precaution is made to prevent a cutter from feeding into stationary work.

When using long boring bar tools for machining holes larger in diameter than the diameter of the boring bar 13, it is necessary to prevent the automatic return of the boring bar to its normal starting position at the top of its stroke. When selector switch 214 is turned away from its normal "automatic" position to the "hand" position, the hydraulic pump motor 32 will be stopped and oil pressure will drop to zero whenever the brake motor 74 is energized and opens normally closed contact BM—5.

With the boring bar 13 in the "up" position, the operator can now depress the unchuck push button 215 which energizes relay 4R through normally closed contacts 1R—3, forward contactor interlock, normally closed contact 1F—5 and relay coil 4R, to close relay contacts 4R—1, 4R—2, 4R—3 and 4R—4 to energize the generator field in the opposite direction to that which was occasioned when relay 1R was closed. Relays VR, 3R and R operate in exactly the same manner as previously described for the chucking operation to control the speed of the main drive motor 46 in the opposite direction for the unchucking of the car wheel, except that the relay contacts 3R—3 close and open to energize and de-energize the reverse contactor 5R which close and open the contacts 5R—1, 5R—2 and 5R—3 to run the main drive motor 46 in the reverse direction. The unchucking operation continues only as long as the operator holds down the push-button 215.

The push button 225 is for jogging when shifting the speed change gears and the operation of the machine is the same as when unchucking.

With the unchucking operation complete, the operator can then operate the electric motor 197 that actuates the hoist 196 for removing the car wheel from the machine, the push-buttons 216 and 217 providing the means for operating the motor in either direction of rotation for raising or lowering the hoist.

A permanent resistor is used in series with this electric hoist motor 197 to limit the stalled torque of the motor and thus prevents breaking of the hoist chain 198.

In the forepart of the specification it was mentioned that the horizontal facing bar 14 was interlocked with the main drive motor with a normally closed contact so that the main drive motor must be operating in order to obtain a feed rate movement of the bar 14. This is contact 220 contained in switch 180. The normally open contact that is closed only for obtaining a traverse of the bar 14 is contact 221 in switch 180.

The aforementioned alternate starting and coasting of the main drive motor as accomplished by the electric circuit just disclosed and described produces the bumping action for closing the clutch jaws 15 as described with reference to the device illustrated in Figure 5, and also, the slow chucking of the car wheel causes a true centering of the car wheel upon the table of the boring machine.

While the apparatus disclosed and described herein constitutes a preferred form of the invention, yet it will be understood that it is capable of mechanical alteration without departing from the spirit of the invention, and that all modifications that fall within the scope of the appended claims are intended to be included herein.

Having thus fully described my invention, what I claim as new and desire to secure by Letters Patent is:

1. The combination in a boring machine of, a rotatable work table, chucking means on said table, an electric motor for driving said work table and operating said chucking means, a generator driven by said motor, electric control means for controlling the supply of current to said electric motor, electric operating means responsive to the current generated by the generator for operating said electric control means to automatically cause said drive motor to operate at a predetermined cyclical variable rate of speed for intermittently driving said chucking means, and manually actuated means operable for constantly rendering said electric operating means effective for any desired period of time.

2. The combination in a boring machine of, a rotatable work table, chucking means on said table, an electric motor for driving said work table and chucking means, a generator driven by said motor and thus having the output thereof vary with the speed of the driving motor, electrical controlling means for controlling a supply of current to said electric motor, and electrical means controlled by the variation of the output from said generator for causing operation of said electrical control means in a cyclical manner to cut off supply of current to said electric motor upon an increase of current produced by the generator and for causing reactuation of the electric control means to supply current to the motor when the current developed by the generator falls off as a result of the coasting of the motor so as to automatically vary the speed of said motor within predetermined limits relative to said work table and chucking means to thereby cause periodic driving of said chucking means to engage or release a work piece on said work table.

3. In a machine tool having a work spindle, a chuck on said work spindle, a driving device associated with said spindle and chuck including a lost motion driving connection actuable to cause said chuck to grip or release a work piece, a source of power connected to said lost motion connection, and a speed responsive device driven from said source of power operable by the change of speed of said source of power to automatically intermittently vary the rate of speed of said source of power in a predetermined cyclical manner for intermittently driving said spindle and operating said chuck for gripping and releasing a work piece.

4. In a machine tool having a rotatable work spindle, a chuck on said spindle, a lost motion drive connection between a main drive motor and the work engaging members of said chuck to effect rotation of said work spindle and movement of the work engaging members, a speed change transmission between said main drive motor and said lost motion driving connection, an electrical speed varying device responsive to speed variations in said main drive motor to vary the application of power supply to said motor automatically in a predetermined cyclical manner so as to cause an intermittent bumping action in said lost motion connection to engage or disengage said chuck with the work piece therein.

5. In a machine tool having a rotatable work spindle, a chuck on said spindle, a lost motion drive connection between a main drive motor and the work engaging members of said chuck to effect rotation of said work spindle and movement of said work engaging members of the chuck, an electrical speed varying device responsive to speed variations in said spindle adapted to control power supply to said motor so as to intermittently energize and de-energize said main drive motor to automatically effect a predetermined cyclical variable speed operation of said main drive motor to cause a bumping action in said lost motion connection for moving said work engaging members of the chuck.

6. In a machine tool having a rotatable work spindle, a chuck on said spindle, a lost motion drive connection between a main drive motor and the work engaging members of said chuck to effect rotation of said work spindle when a work piece is gripped in said chuck and said main drive motor is energized, a speed change transmission between said main drive motor and said lost motion driving connection, an electrical speed responsive control mechanism for the power supply to said motor responsive to speed variations in said spindle to vary the application of power to said main drive motor in a predetermined automatic manner to cause an intermittent bumping action in said lost motion connection to engage or disengage said chuck with the work piece therein, a brake associated with said work spindle, and means responsive to the energization of said main drive motor to control the operation of said brake.

7. In a vertical boring mill having a spindle including a work table, chuck jaws arranged for radial movement on said table, cam means for moving said chuck jaws, a drive ring having a lost motion connection with said cam means, a main drive motor directly connected to said drive ring, an electric generator connected to be driven from said main drive motor and drive ring, and electrical control mechanism interconnected between said generator and said main drive motor actuable by variations in output from said generator to effect energizing and de-energizing of said main drive motor automatically in a predetermined cyclical manner to vary the speed of said motor to effect intermittent bumping action in said lost motion connection between said drive ring and said cam means.

8. In a vertical boring mill having a spindle including a work table, chuck jaws arranged for radial movement on said table, cam means for moving said chuck jaws, a drive ring having a lost motion connection with said cam means, a change speed transmission having its output connected to said drive ring, a main drive motor connected to actuate said transmission, an electrical speed control device connected to the output from said transmission, and electrical control mechanism interconnected between said device and said main drive motor operated by said device to vary power supply to said motor in a predetermined cyclical manner to effect energizing and de-energizing of said main drive motor so as to vary said motor speed to cause an intermittent bumping action in said lost motion connection to effect movement of said chuck jaws.

9. In a vertical boring mill having a spindle including a work table, chuck jaws disposed for radial movement on said table, cam means for moving said chuck jaws, a drive ring having a lost motion connection with said cam means, a main drive motor connected to said drive ring, an electric speed responsive control generator connected to be driven from said main drive motor and drive ring, electrical control mechanism interconnected between said generator and said main drive motor operable by speed variations of said generator to effect intermittent application of power to said motor in predetermined cyclical manner for energizing and de-energizing of said main drive motor to automatically vary the motor speed to effect a bumping action in said lost motion connection between said drive ring and said cam means, a brake for restricting rotation of said work spindle, and means responsive to the energization of said main drive motor for actuating said brake to stop rotation of said work spindle when said main drive motor is de-energized.

10. In a machine tool having a work spindle, a chuck on said work spindle, a drive motor for rotating said work spindle and for actuating said chuck for gripping or releasing a work piece, a speed varying device driven from said main drive motor and responsive to the rate of change of rotation of said motor to effect automatic intermittent energizing of said motor at variable speed cycles within a predetermined range each side of a predetermined slow speed range, and further electric control means for rendering said motor operative at full speed or to stop said motor.

11. In a machine tool having a work spindle, a chuck on said work spindle, a drive motor for both rotating said work spindle and actuating said chuck for gripping and releasing a work piece, a speed responsive device driven from said main drive motor responsive to the rate of change of rotation of said motor to effect intermittent energizing of said motor in a predetermined slow speed range, further electric control means for rendering said motor operative at full speed or to stop said motor, a tool feeding device movable relative to said chuck, power means for actuating said tool feeding device, and means responsive to the energizing of said main drive motor in full speed operation to render said power means operative to actuate said tool feeding device.

12. In a machine tool having a work holder including work gripping members engageable or disengageable with a work piece presented in said work holder, power means for actuating said work engaging members toward or from the work piece to be gripped including a lost motion drive connection, a prime mover attached to said connection, and means responsive to variations in the rate of operation of said prime mover to control the application of power to said motor for intermittently energizing said prime mover to vary the rate of speed of said prime mover automatically in a predetermined cyclical manner to effect a gripping or releasing of a work piece in said work holder.

13. In a machine tool having a work spindle, a chuck on said work spindle, a drive member having limited movement relative to said spindle and chuck, a drive motor for actuating said member, a speed varying device driven from said main drive motor and responsive to the rate of change of rotation of said motor to automatically effect intermittent energizing of said motor in predetermined cycles of variable speed, and means including a lost motion connection for actuating the work engaging members of said chuck from said drive member.

14. In a machine tool having a work spindle, a chuck on said work spindle, a drive motor connected through a lost motion connection to rotate said work spindle and to actuate said chuck for gripping or releasing a work piece, a speed control generator driven from said main drive motor and responsive to the rate of change of rotation of said motor, and electrical control apparatus associated with said generator to vary the power supply to said main drive motor to cause said motor to operate automatically at a predetermined cyclical variation of speed by intermittent energizing and de-energizing of said motor while operating within a predetermined slow speed range.

15. In a machine tool having a work spindle, a chuck on said work spindle, a drive motor connected through a lost motion connection to rotate said work spindle and to actuate said chuck for gripping or releasing a work piece, a speed varying generator driven from said main drive motor and responsive to the rate of change of rotation of said motor, electrical control apparatus associated with said generator to vary the power supply to said main drive motor to effect intermittent energizing and de-energizing of said motor to automatically cause variable speed operation of said motor at a predetermined cyclical rate within a predetermined slow speed range, and further electrical control apparatus for rendering said motor operative at full speed or to stop said motor.

16. In a machine tool having a work spindle, a chuck on said work spindle, a drive motor for both rotating said work spindle and actuating said chuck for gripping and releasing a work piece, a speed responsive device driven from said main drive motor responsive to the rate of change of rotation of said motor to automatically control the application of power to said motor in a predetermined cyclical manner to effect intermittent energizing of said motor within a predetermined slow speed range, further electrical control means for rendering said motor operative at full speed or to stop said motor, a brake device associated with said work spindle, power means for actuating said brake, and electrical control means for said power means responsive to the de-energizing of said main drive motor from full speed operation to render said brake operative to arrest rotation of said spindle, and further means to cause said power means to release said brake when said motor is energized.

OTTO E. SCHURR.

REFERENCES CITED

The following references are of record in the file of this patent:

UNITED STATES PATENTS

| Number | Name | Date |
|---|---|---|
| 981,724 | Vold | Jan. 17, 1911 |
| 1,376,452 | Meyer | May 3, 1921 |
| 1,469,360 | Cullen | Oct. 2, 1923 |
| 1,570,799 | Trosch et al. | Jan. 26, 1926 |
| 1,649,411 | Kaseberg | Nov. 15, 1927 |
| 1,650,693 | Cole | Nov. 29, 1927 |
| 1,986,862 | Svenson | Jan. 8, 1935 |